Figure 2:
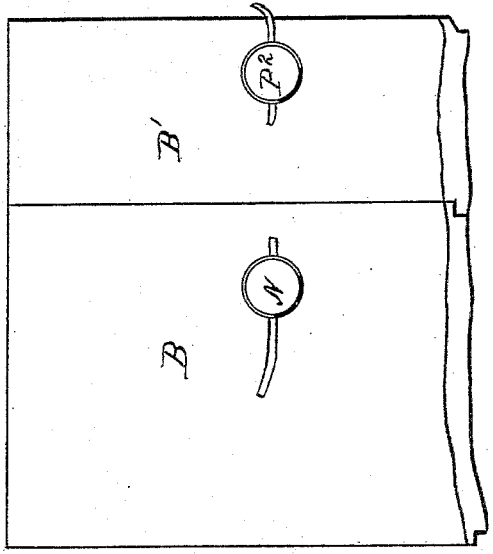

(No Model.) 2 Sheets—Sheet 1.

N. W. PERRY.
GALVANIC CELL.

No. 356,727. Patented Jan. 25, 1887.

ATTEST
M. M. Smith
O. M. Hill

INVENTOR
Nelson W. Perry
per Wm. Hubbell Fisher,
ATT'Y (No Model.)

N. W. PERRY.
GALVANIC CELL.

No. 356,727. Patented Jan. 25, 1887.

2 Sheets—Sheet 2.

Attest
H. P. Gulick,
W. S. Christopher

Inventor
Nelson W. Perry
per Wm. Hubbell Fisher
Atty.

UNITED STATES PATENT OFFICE.

NELSON W. PERRY, OF NORWOOD, ASSIGNOR OF PART TO FREDERICK FORCHHEIMER AND HERMAN J. GROESBECK, BOTH OF CINCINNATI, OHIO.

GALVANIC CELL.

SPECIFICATION forming part of Letters Patent No. 356,727, dated January 25, 1887.

Application filed March 19, 1886. Serial No. 195,792. (No model.)

*To all whom it may concern:*

Be it known that I, NELSON W. PERRY, a citizen of the United States, and a resident of the town of Norwood, in the county of Hamilton and State of Ohio, have invented certain new and useful Improvements in Galvanic Cells, of which the following is a specification.

The object of my invention is to produce an open-circuit cell that will not polarize; also, to accomplish for single liquid-batteries in general, in the way of depolarization, what has heretofore been accomplished only by a second liquid.

My conducting-electrode is carbon, and in the form in which I use it it accomplishes its own depolarization. I make use of the well-known property of porous carbon—viz., the property of condensing or occluding within its pores the various gases. If one of these gases be oxygen, it acts upon the other gases in the same way as does nascent oxygen or ozone. This is the first feature of my invention.

This porous carbon exposes to the battery-liquid a much larger surface than can be obtained in any other way within a given space, and will therefore, in itself, be an electrode superior to the usual dense-carbon electrode, of whatever shape it may be made. If a piece of porous carbon be immersed in the battery-liquid, this liquid comes in contact with the boundary of each little pore in the carbon mass, in this way making the electrical surface of the carbon equal to the sum of the surfaces of the pores, and the exterior of the carbon thereby obtaining the greatest possible surface in the least possible volume of the carbon. This is the second feature of my invention. If, however, the porous carbon be completely immersed in the battery-liquid and the circuit be closed, polarization is merely a question of time, as there can be no renewal of the oxidizing agent—viz., oxygen from the air.

Therefore, another feature of my invention has reference to enabling the porous carbon to be a constant means for depolarization, and this feature of invention consists in such arrangement of the porous carbon that while one side or portion of the carbon is in contact with the battery-liquid the other side or portion is exposed to the air. By this arrangement the porous carbon is occluding the polarizing-gases on one side and occluding the depolarizing agent (oxygen from the atmosphere) on the other. In this way I obtain a constant and inexhaustible supply of a depolarizer.

As the internal resistance of a galvanic cell is (other things being equal) proportional to the distance apart of the two electrodes, or, in other words, is proportional to the resistance of the conducting-fluid, it is desirable to place the two electrodes as near together as possible. Practically the best results have been obtained by a considerable separation of the two, the better circulation of the battery-liquid thereby obtained compensating for the loss due to their further separation.

In my device (as will be fully set forth further on) I have succeeded in making the mathematical axes of the two electrodes coincident, at the same time having sufficient actual space between the electrodes to allow free circulation of the battery-fluid. In this way, since each electrode may be considered as acting in its mathematical axis alone, I have the electrodes coincident without interfering with the circulation of the battery-fluid.

Another feature of my invention, therefore, consists in the arrangement of the generating-electrode and of the conducting-electrode so that the mathematical axis of the generating-electrode shall be coincident with the mathematical axis of the conducting-electrode. Where the porous carbon is placed horizontally and partly immersed in the battery-fluid, its tendency is to draw to the upper surface, by capillary attraction, the battery-fluid, which upon evaporation deposits its salts, and eventually stops up the pores, thereby precluding the possibility of occlusion of atmospheric oxygen which is to act as the depolarizing agent. To prevent this action, due to capillary attraction, I apply to the upper surface of the porous carbon a substance not wetted with the battery-fluid, which opposes the capillary attraction. A grease of some kind meets this want most fully, as it is not wetted by any of the battery-liquids now in use except alkaline solutions, which may saponify it. For this purpose I prefer a substance that is solid at ordinary temperatures, such as paraffine. In applying it to the upper surface of the carbon care must be taken not to close the pores, else the efficiency of the carbon as an occluder of oxygen, and consequently as a depolarizer will be destroyed.

Another feature of my invention, therefore, is the application to one side of a piece of porous carbon of a substance not wetted by the battery-fluid, and which therefore opposes capillary attraction.

In addition to the means already set forth for preventing and correcting polarization, another feature of my invention consists in means whereby the conducting-electrode is arranged to collect the polarizing-gases and mechanically to disperse them.

Figure 3:
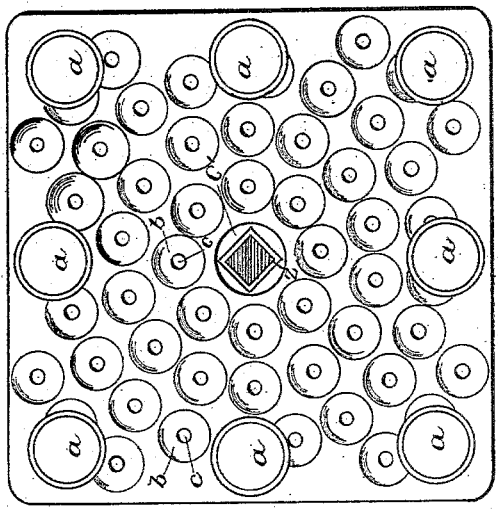
Figure 1:
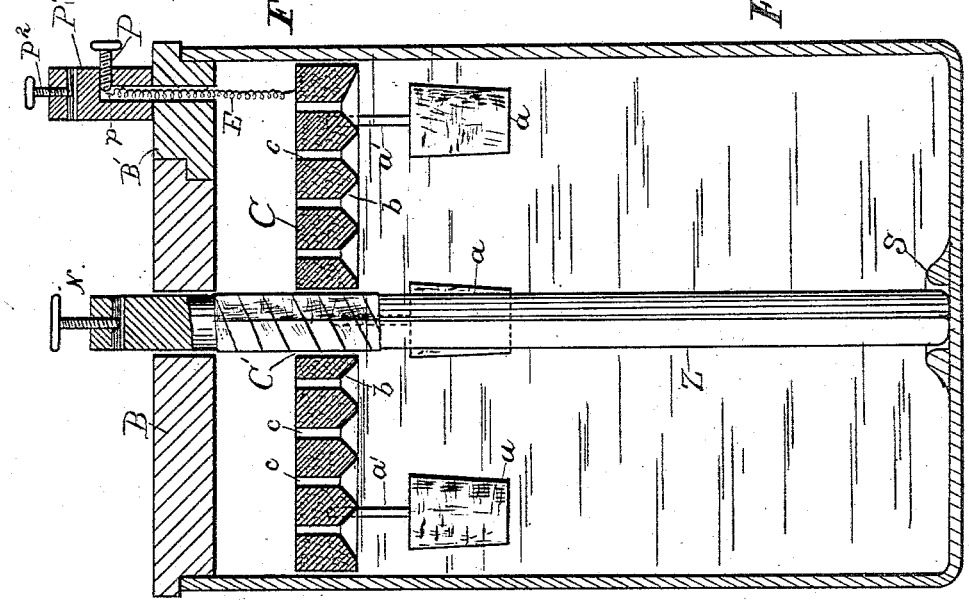
Figure 4:
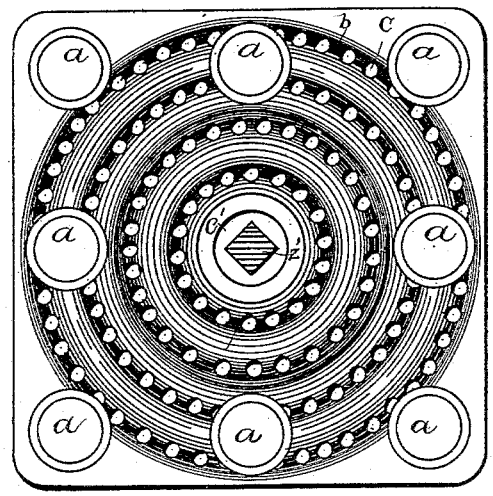

In the accompanying drawings, forming part of this specification, Figure 1 is a vertical central section of my improved cell. Fig. 2 is a top view of same. Fig. 3 is a view of the under side of the carbon element with its attachments. Fig. 4 is a view of the under side of the carbon element, which is provided with corrugations, instead of the depressions shown in Fig. 3.

The containing vessel or cell A is preferably made of glass, and may be either circular or square in cross-section, the latter form being preferred.

The conducting-electrode C is made of porous carbon. In outline it preferably conforms in shape to that of the containing-vessel, and is flat, being of such thickness as will best enable it to perform its functions. This conducting-electrode, in the preferred form of the element as illustrated, is located at the surface of the battery-fluid, and preferably has its upper surface out of the fluid in direct contact with the atmospheric air. To enable it to maintain this position with the varying level of the fluid, means are provided to float it on the surface of the fluid. The preferred means of accomplishing this is that illustrated in Fig. 1. A number of corks, $a$, of sufficient buoyancy to float the carbon are provided. The carbon is mounted on these corks by means of the stems $a'$, which are made of wood or other non-conducting material not acted upon by the battery-fluid.

While the corks form the preferable mode of supporting the carbon, other means may be provided; but it is essential that the buoyant body be not affected by the battery-liquid, in order not to induce secondary currents within the cell. The under surface of the carbon is provided with a number of depressions or corrugations, $b$. From these depressions or corrugations tubules $c$ extend entirely through the carbon. An opening, $c'$, is cut through the center of the carbon.

The generating-electrode is preferably zinc; but other metals which the battery-liquid is capable of acting upon may be substituted. It is intended to have the axis of this generating-electrode coincide with the axis of the conducting-electrode C. To accomplish this object I pass the positive element through the center of the opening $c'$, and maintain it in a vertical position—that is to say, at right angles to the surface of the horizontal floating plate C. Preferably, the bar Z (the generating-electrode) rests on the bottom of the jar in a seat, S, which prevents displacement of its lower end. The upper end of the bar is supported by the cap B, through which it passes loosely.

The cap or cover of the cell is preferably made in two parts, B and B', as shown in Figs. 1 and 2, so as to allow ready access to the cell.

To prevent the bar Z from coming into electrical contact with the conducting-electrode, the upper portion of the bar within the cell is insulated in any suitable manner. The upper end of the bar Z is fashioned into a binding-post, and is provided with a binding-screw, N, for the attachment of a wire.

The binding-post P' is secured to the top of the piece B' of the cover. It is provided with a vertical opening, $p$, communicating with the interior of the cell, and into which the platinum wire E passes, and is there clamped by the binding-screw P. The upper part of the post P' is provided with another binding-screw, P², for the attachment of the conducting-wire. The wire E is coiled, so as to allow the rise and fall of the carbon plate. The method of attachment of this platinum wire to the carbon is not important beyond securing good electrical contact.

For the purpose already mentioned, the upper surface of the carbon, which is just above the surface of the fluid, is preferably smeared with a hard fat or wax, such as stearine or paraffine. This covering of the top of the carbon with a substance not wetted by the battery-liquid performs a very important function, which will be fully explained farther on.

As one means illustrative of the application of the principle, I mention the use of a saturated solution of ammonium chloride as the battery-fluid.

The operation of the battery is as follows: When the circuit is closed the battery acts, electricity is developed, and the salt in solution—viz., the ammonium chloride—is decomposed. In this decomposition the acid radical of the ammonium chloride enters into combination with the zinc to form zinc chloride, while the other products of the decomposition—viz., ammonia gas, or perhaps hydrogen—are liberated on the carbon and a certain degree of polarization would be expected; but polarization is prevented in my cell in the following manner: The carbon is porous and has the property of occluding gases within its pores. Being continually exposed to the atmosphere, an abundant supply of oxygen is provided and is occluded within the porous carbon. This oxygen unites with the electro-positive elements of the decomposition as fast as they are liberated on the carbon, and in this way polarization is prevented. The depressions or corrugations *b* and the tubules *c* act as collectors and avenues of escape for the polarizing-gases, and thus mechanically assist in preventing polarization.

In consequence of the porosity of the carbon, capillary attraction draws the battery-fluid into the carbon, whose effective electrical surface is in this way multiplied enormously, as previously explained. The continued action of this capillarity would, however, be unfortunate, as it would result in some of the fluid collecting on the top of the carbon plate, where the water would evaporate and leave the salt to mechanically stop up the pores of the carbon, thus interfering with its depolarizing action. To avoid this condition the use of the stearine or paraffine is resorted to. Such substance is applied to the top of the carbon in such small quantity and in such manner as not to clog up the small pores, and thus prevent the occlusion of the oxygen, yet, nevertheless, it does prevent the deposit of crystals of battery salts on the top of the carbon plate. The axes of the two electrodes being coincident, so much of the internal resistance as is due to separation of the elements is eliminated, because these elements act as if their whole action was concentrated in their mechanical centers.

When a cell has continued long in action, crystals form on the generating electrode, and tend to reduce the effective electrical surface. On trial of my cell I have found these crystals to form only after the expiration of a very long period, much longer than that at which they appear in the Teclauchi cell, and, moreover, they have formed on the zinc only below the level of the bottom of the corks, and to some slight extent on the corks themselves. By coating the corks with paraffine this crystalization on them is prevented, and at the same time the corks are rendered much more durable. As the water evaporates from the fluid the floating carbon sinks, and thus maintains the proper relations of the parts of the cell. It is well to have an excess of the ammonium chloride in the cell, so that the fluid may be renewed by the addition of water alone.

This battery is peculiarly constant and continuous in action. It presents a minimum of internal resistance, and polarization is almost impossible. Its mechanical features are such as make it cheap in price, easy of repair, certain in action, and not liable to derangement.

While the various features of my invention are preferably employed together, one or more of said features may be employed without the remainder, and, in so far as applicable, one or more of said features may be employed in connection with galvanic cells of a description other than that herein specifically set forth.

What I claim as new and of my invention, and desire to secure by Letters Patent, is—

1. An electric cell in which the conducting-electrode is a plate floated on the surface of the fluid, substantially as and for the purposes specified.

2. An electric cell in which the conducting-electrode is a plate floated on the surface of the fluid and provided with openings for the escape of the polarizing-gases, substantially as and for the purposes specified.

3. An electric cell in which the conducting-electrode is a plate of porous carbon floated upon the surface of the fluid, as and for the purposes specified.

4. As the conducting-electrode in an electric cell, a horizontal floating plate of porous carbon, substantially as and for the purposes specified.

5. As the conducting-electrode in an electric cell, a plate of porous carbon, one surface of which is coated with a substance not wetted by the battery-fluid, substantially as and for the purposes specified.

6. The horizontal plate of porous carbon C, provided with tubules *c*, as and for the purposes set forth.

7. The horizontal porous carbon plate C, provided with tubules *c*, and having its upper surface covered with a substance not wetted by the battery-fluid, substantially as and for the purposes specified.

8. The horizontal porous carbon plate C, provided with depressions or corrugations *b* and tubules *c*, as and for the purposes set forth.

9. The porous carbon plate C, provided with depressions or corrugations *b* and tubules *c*, and having its upper surface covered with a substance not wetted by the battery-fluid.

10. As an electrode in a battery-cell, a porous carbon, in combination with a buoyant body to float the same, as and for the purposes specified.

11. The porous carbon plate C, in combination with the corks *a*, substantially as and for the purposes specified.

12. The combination of the cell A, containing a saturated solution of ammonium chloride, the carbon plate C, buoyed by corks *a*, and zinc bars Z, passing vertically through the center of the carbon plate, substantially as and for the purposes specified.

NELSON W. PERRY.

Witnesses:
JNO. W. STREHLI,
E. M. HARMON.